United States Patent
Dickinson

(10) Patent No.: US 8,175,570 B2
(45) Date of Patent: May 8, 2012

(54) E911 CALL BLOCKING FOR NON-INITIALIZED WIRELESS TELEPHONES

(75) Inventor: Richard Dickinson, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 758 days.

(21) Appl. No.: 11/440,084

(22) Filed: May 25, 2006

(65) Prior Publication Data

US 2007/0041516 A1    Feb. 22, 2007

Related U.S. Application Data

(60) Provisional application No. 60/684,554, filed on May 26, 2005.

(51) Int. Cl.
H04M 11/04 (2006.01)
(52) U.S. Cl. ................ 455/404.1; 455/417
(58) Field of Classification Search .......... 455/417, 455/445
See application file for complete search history.

(56) References Cited

U.S. PATENT DOCUMENTS

| | | | |
|---|---|---|---|
| 4,625,081 | A | 11/1986 | Lotito |
| 6,321,091 | B1 | 11/2001 | Holland |
| 6,427,001 | B1 | 7/2002 | Contractor |
| 6,456,852 | B2 | 9/2002 | Bar et al. |
| 6,529,500 | B1 | 3/2003 | Pandharipande |
| 6,529,722 | B1 | 3/2003 | Heinrich |
| 6,584,307 | B1 | 6/2003 | Antonucci et al. |
| 6,650,901 | B1 | 11/2003 | Schuster et al. |
| 6,678,357 | B2 | 1/2004 | Stumer et al. |
| 6,744,856 | B2 | 6/2004 | Karnik et al. |
| 6,744,858 | B1 | 6/2004 | Ryan |
| 6,771,742 | B2 | 8/2004 | McCalmont et al. |
| 6,775,534 | B2 | 8/2004 | Lindgren |
| 6,799,049 | B1 | 9/2004 | Zellner |
| 6,813,264 | B2 | 11/2004 | Vassilovski |
| 6,940,950 | B2 | 9/2005 | Dickinson et al. |
| 6,963,557 | B2 | 11/2005 | Knox |
| 6,968,044 | B2 | 11/2005 | Beason |

(Continued)

FOREIGN PATENT DOCUMENTS

WO    WO9921380    4/1999

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Charles Appiah
*Assistant Examiner* — Jaime Holliday
(74) *Attorney, Agent, or Firm* — William H. Bollman

(57) ABSTRACT

Calls from a phone identified as being a source of harassing or other undesirable phone calls are blocked at a mobile positioning center (MPC). Upon request by the PSAP, a call record detail can be obtained from the MPC revealing a simulated "callback phone number". The MPC then intercepts all future incoming calls from that simulated callback phone number and routes them to a recording that advises the harasser that the phone has been identified as a harasser and is now blocked. The recording can also advise the caller how to restore service. In a preferred embodiment, the MPC sets a timer to automatically restore service after a designated length of time.

18 Claims, 3 Drawing Sheets

U.S. PATENT DOCUMENTS

| | | |
|---|---|---|
| 7,136,466 B1 | 11/2006 | Gao |
| 7,171,220 B2 | 1/2007 | Belcea |
| 7,177,397 B2 | 2/2007 | McCalmont |
| 7,177,399 B2 | 2/2007 | Dawson |
| 7,194,249 B2 | 3/2007 | Phillips |
| 7,245,900 B1 | 7/2007 | Lamb |
| 7,260,186 B2 | 8/2007 | Zhu |
| 7,260,384 B2 | 8/2007 | Bales et al. |
| 7,330,899 B2 | 2/2008 | Wong |
| 7,333,480 B1 | 2/2008 | Clarke |
| 7,366,157 B1 | 4/2008 | Valentine |
| 7,369,530 B2 | 5/2008 | Keagy |
| 7,412,049 B1 * | 8/2008 | Koch .................. 379/210.02 |
| 7,440,442 B2 | 10/2008 | Grabelsky et al. |
| 7,453,990 B2 | 11/2008 | Welenson |
| 7,573,982 B2 | 8/2009 | Breen |
| 7,617,287 B2 | 11/2009 | Vella |
| 7,702,081 B1 | 4/2010 | Klesper |
| 7,787,611 B1 | 8/2010 | Kotelly |
| 2001/0021646 A1 | 9/2001 | Antonucci et al. |
| 2001/0040886 A1 | 11/2001 | Jimenez |
| 2002/0118796 A1 | 8/2002 | Menard |
| 2002/0126656 A1 | 9/2002 | Park |
| 2003/0026245 A1 | 2/2003 | Ejzak |
| 2003/0069002 A1 | 4/2003 | Hunter et al. |
| 2003/0086539 A1 | 5/2003 | McCalmont |
| 2003/0096623 A1 | 5/2003 | Kim |
| 2003/0109245 A1 | 6/2003 | McCalmont |
| 2004/0043775 A1 | 3/2004 | Kennedy |
| 2004/0132465 A1 | 7/2004 | Mattila et al. |
| 2004/0150518 A1 | 8/2004 | Phillips et al. |
| 2004/0152493 A1 | 8/2004 | Phillips et al. |
| 2004/0176123 A1 | 9/2004 | Chin |
| 2004/0180671 A1 | 9/2004 | Spain |
| 2004/0184584 A1 | 9/2004 | McCalmont |
| 2004/0190497 A1 | 9/2004 | Knox |
| 2004/0203568 A1 | 10/2004 | Kirtland |
| 2004/0203575 A1 * | 10/2004 | Chin et al. .................. 455/404.1 |
| 2004/0247090 A1 | 12/2004 | Nurmela |
| 2005/0003797 A1 | 1/2005 | Baldwin |
| 2005/0030977 A1 | 2/2005 | Casey et al. |
| 2005/0048987 A1 | 3/2005 | Glass |
| 2005/0083911 A1 | 4/2005 | Grabelsky |
| 2005/0085257 A1 | 4/2005 | Laird |
| 2005/0107673 A1 | 5/2005 | Ball |
| 2005/0169248 A1 | 8/2005 | Truesdale |
| 2005/0190892 A1 | 9/2005 | Dawson |
| 2005/0201528 A1 | 9/2005 | Meer |
| 2005/0201529 A1 | 9/2005 | Nelson |
| 2005/0261002 A1 | 11/2005 | Cheng |
| 2005/0282518 A1 | 12/2005 | D'Evelyn |
| 2006/0058049 A1 | 3/2006 | McLaughlin |
| 2006/0068753 A1 | 3/2006 | Karpen |
| 2006/0069503 A1 | 3/2006 | Suomela et al. |
| 2006/0120517 A1 | 6/2006 | Moon |
| 2006/0125692 A1 | 6/2006 | Wang |
| 2006/0135132 A1 * | 6/2006 | Cai et al. .................. 455/414.1 |
| 2006/0188083 A1 | 8/2006 | Breen |
| 2006/0193447 A1 | 8/2006 | Schwartz |
| 2006/0293024 A1 | 12/2006 | Benco |
| 2007/0003024 A1 | 1/2007 | Olivier |
| 2007/0019614 A1 | 1/2007 | Hoffmann |
| 2007/0021908 A1 | 1/2007 | Jaugilas |
| 2007/0036139 A1 | 2/2007 | Patel |
| 2007/0041513 A1 | 2/2007 | Gende |
| 2007/0115941 A1 | 5/2007 | Patel |
| 2007/0121601 A1 | 5/2007 | Kikinis |
| 2007/0160036 A1 | 7/2007 | Smith |
| 2007/0253429 A1 | 11/2007 | James |
| 2007/0263610 A1 | 11/2007 | Mitchell |
| 2007/0293205 A1 | 12/2007 | Henderson |
| 2008/0081646 A1 | 4/2008 | Morin et al. |
| 2009/0003535 A1 | 1/2009 | Grabelsky |
| 2009/0128404 A1 | 5/2009 | Martino |
| 2010/0003954 A1 | 1/2010 | Greene |

FOREIGN PATENT DOCUMENTS

| | | |
|---|---|---|
| WO | WO99/22546 | 5/1999 |
| WO | WO02/11407 | 7/2001 |
| WO | WO2004/098213 | 11/2004 |

OTHER PUBLICATIONS

International Search Report in PCT/US/2010/01938 dated Sep. 30, 2010.

Schulzrinne et al., Emergency Services for Internet Telephony Systems draft-schulzrinne-sipping-emergency-arch, IETF Standard Working Draft, Feb. 4, 2004, 1-22.

European Search Report in European appl. No. 06851433.0-2413 dated Aug. 8, 2008 "Location Services (LCS); Functional Description; stage 2; ETSI TS 101 724," ETSI Standards, Jun. 2004 (2004-2006), XP014016068, sect. 4, section 5.6.6., fig 3, sect. 7.6.2, fig. 30.

* cited by examiner

E911 CALL BLOCKING FOR NON-INITIALIZED WIRELESS TELEPHONES

This application claims priority from U.S. Provisional Appl. No. 60/684,554, filed May 26, 2005, entitled "E911 Call Blocking For Non-Initialized Wireless Telephones", by Richard Dickinson, the entirety of which is expressly incorporated herein by reference.

BACKGROUND OF THE INVENTION

1. Field of the Invention

This invention relates generally to wireless services. More particularly, it relates to E911 wireless services.

2. Background of the Related Art The FCC has mandated that all wireless telephones must be able to dial 9-1-1, even if other service is denied. This includes uninitialized phones (i.e., cellular phones that have not yet been activated by the wireless carrier). Uninitialized phones have no assigned phone number and are virtually untraceable. Because of this, they have become a popular way for mischief-makers to place hundreds or thousands of harassment calls to Public Safety Answering Points (PSAPs), thereby compromising the ability of the PSAPs to respond to real emergencies.

FIG. 3 shows conventional elements relating to routing of an E911 call from a cell phone.

In particular, as shown in FIG. 3, a conventional wireless carrier's mobile switching center (MSC) 502 contacts a Mobile Positioning Center (MPC) 504 to ascertain proper routing of an E911 call. The MPC 504 responds with routing information and the MSC 502 then routes the call to the correct PSAP 208. The MPC 504 stores the caller's call-back number and location in a dynamic database and relays that information to the PSAP 208 at the appropriate time.

Currently, uninitialized phones are identified only with a nonfunctional, simulated "callback" number that consists of a portion of the phone's electronic serial number (ESN). The FCC has authorized wireless carriers to terminate service to these phones if the PSAP identifies the phone as a harrasser. Some MSCs are capable of blocking single ESNs, while others are less flexible and must block all uninitialized phones. The effort to block these calls at the MSC 502 is time consuming and troublesome.

Thus, disadvantages of the current solutions include: (1) It requires time consuming manual intervention to block identified calls; (2) Once a call is blocked, it remains blocked until a technician manually restores service; and (3) Some wireless switches cannot block individual telephones.

Moreover, once blocked, the subsequent legitimate user of the phone is not advised that the phone has been blocked.

There is a need for improved technology for blocking E911 calls from a non-initialized wireless telephone deemed to have previously been used to make a harassing or illegitimate call to 9-1-1.

SUMMARY OF THE INVENTION

In accordance with the principles of the present invention, a method of blocking an undesirable call from being routed to an intended recipient comprises associating a simulated callback phone number with the undesirable call. A mobile positioning center (MPC) is queried for routing instructions for the undesirable call. The simulated callback phone number is compared with a known list of callback phone numbers to be blocked. If a match is made by the comparing, routing of the undesirable call to the intended recipient is blocked at the mobile positioning center (MPC).

Apparatus for blocking an undesirable wireless call from being routed according to yet another aspect of the invention comprises a blocked phone number list maintained by a mobile positioning center (MPC). A module compares a callback number associated with a received query for routing instructions to entries in the blocked phone number list. If a match is made between the callback number and an entry in the blocked phone number list, routing to an intended destination is refused.

DETAILED DESCRIPTION OF ILLUSTRATIVE EMBODIMENTS

In accordance with the principles of the present invention, calls from a phone identified as being a source of harassing or other undersirable phone calls are blocked at a mobile positioning center (MPC), rather than at the MSC as in conventional systems. Upon request by the PSAP (e.g., a PSAP designated as servicing the location from which the harassing call originates or is registered in), a call record detail can be obtained from the MPC revealing a simulated "callback phone number" of the mobile phone identified to have made a harassing call. The MPC then intercepts all future incoming calls from that phone corresponding to the simulated callback phone number, and routes this and any future calls therefrom to a recording that advises the harasser that the phone has been identified as a source of harassing phone calls and is now blocked. The recording can also advise the caller how to restore service. In a preferred embodiment, the MPC sets a timer to automatically restore service after a designated length of time.

Figure 1:
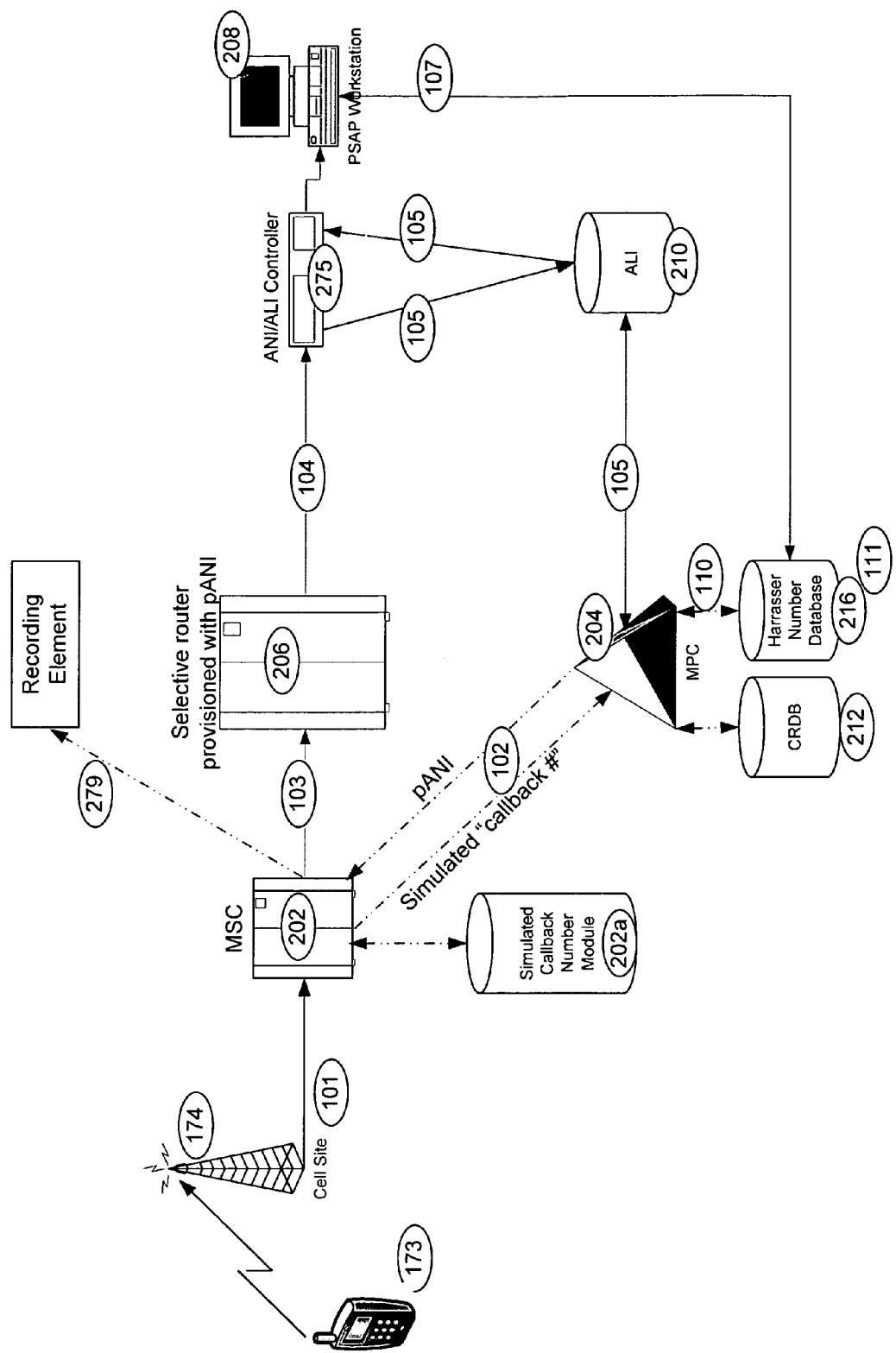
FIG. 1 shows exemplary network elements relevant to call blocking for E911 harassment calls, in accordance with the principles of the present invention.

FIG. 1 shows exemplary network elements relevant to call blocking for E911 harassment calls, in accordance with the principles of the present invention. The disclosed wireless infrastructure is implemented to support subsequent 9-1-1 calls.

In particular, as shown in FIG. 1, a mobile phone 173 communicates with a given cell site 174. The cell site 174 communicates with a mobile switching center (MSC) 202 in a wireless carrier's network. The mobile switching center (MSC) 202 is the wireless equivalent to a landline end office.

Importantly, according to the invention, the MSC 202 includes a simulated callback phone number module 202a. The simulated callback phone number module 202a provides a simulated callback number for a given wireless phone calling 911. In the disclosed embodiments, the simulated callback number comprises "911" plus the last 7 digits of the ESN (totaling 10 digits). This format is typical per current industry standards, but can be modified in any manner that uniquely identifies the telephone.

An appropriate mobile positioning center 204 also communicates with the ALI database 210 and the coordinate routing database (CRDB) 212. The mobile positioning center (MPC) 204 is the call routing "mastermind" that maintains a database of cellular towers and which PSAPs should receive calls from which cellular tower. The MSC 202 relies upon the MPC 204 to determine which selective router should receive the E911 call. The MPC 204 also communicates with the PSAP 208 to inform the PSAP 208 of the caller's phone number and address.

Figure 2:
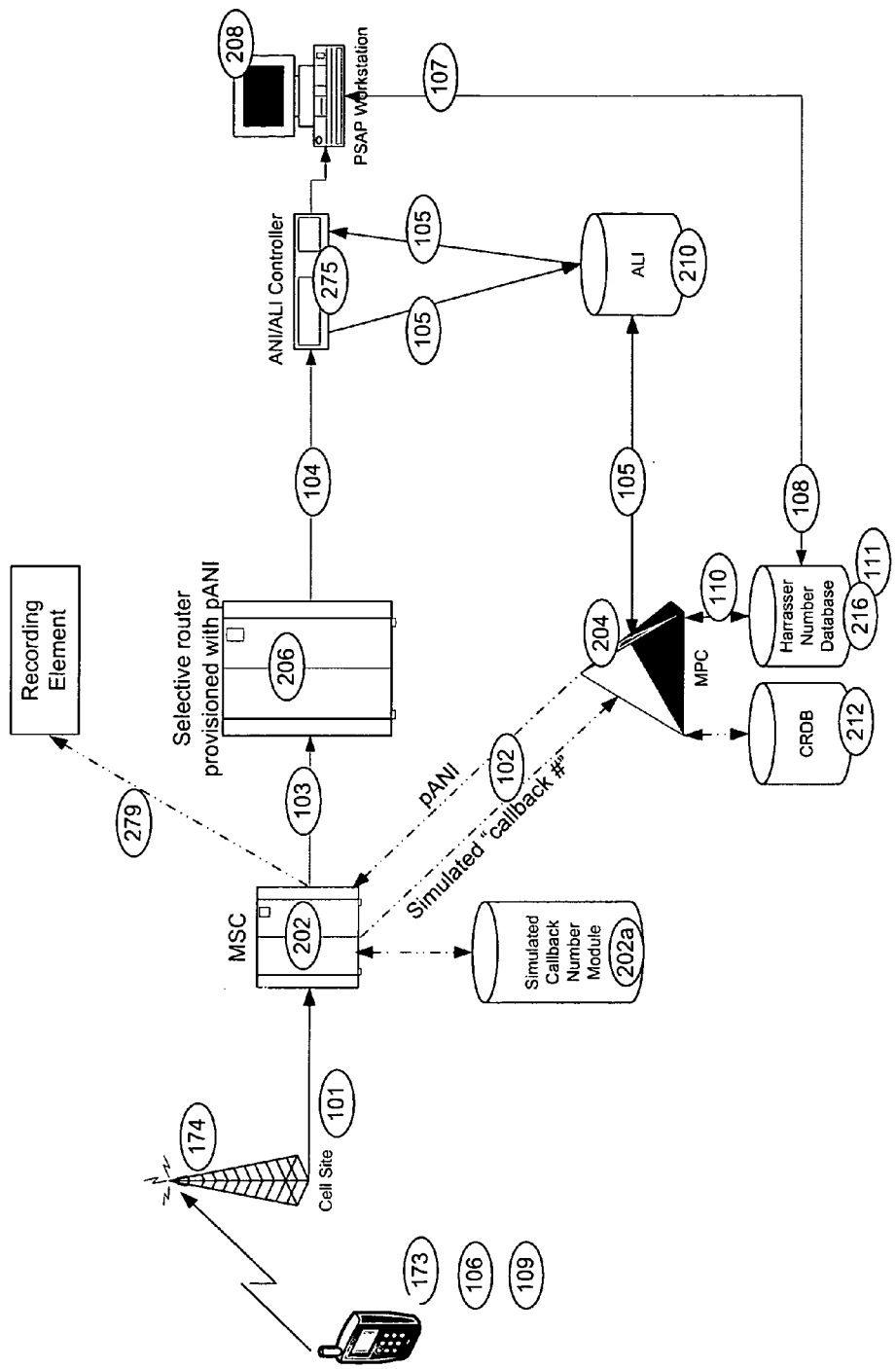
FIG. 2 shows exemplary messaging to accomplish call blocking for E911 harassment calls, in the exemplary system shown in FIG. 1.
Figure 3:
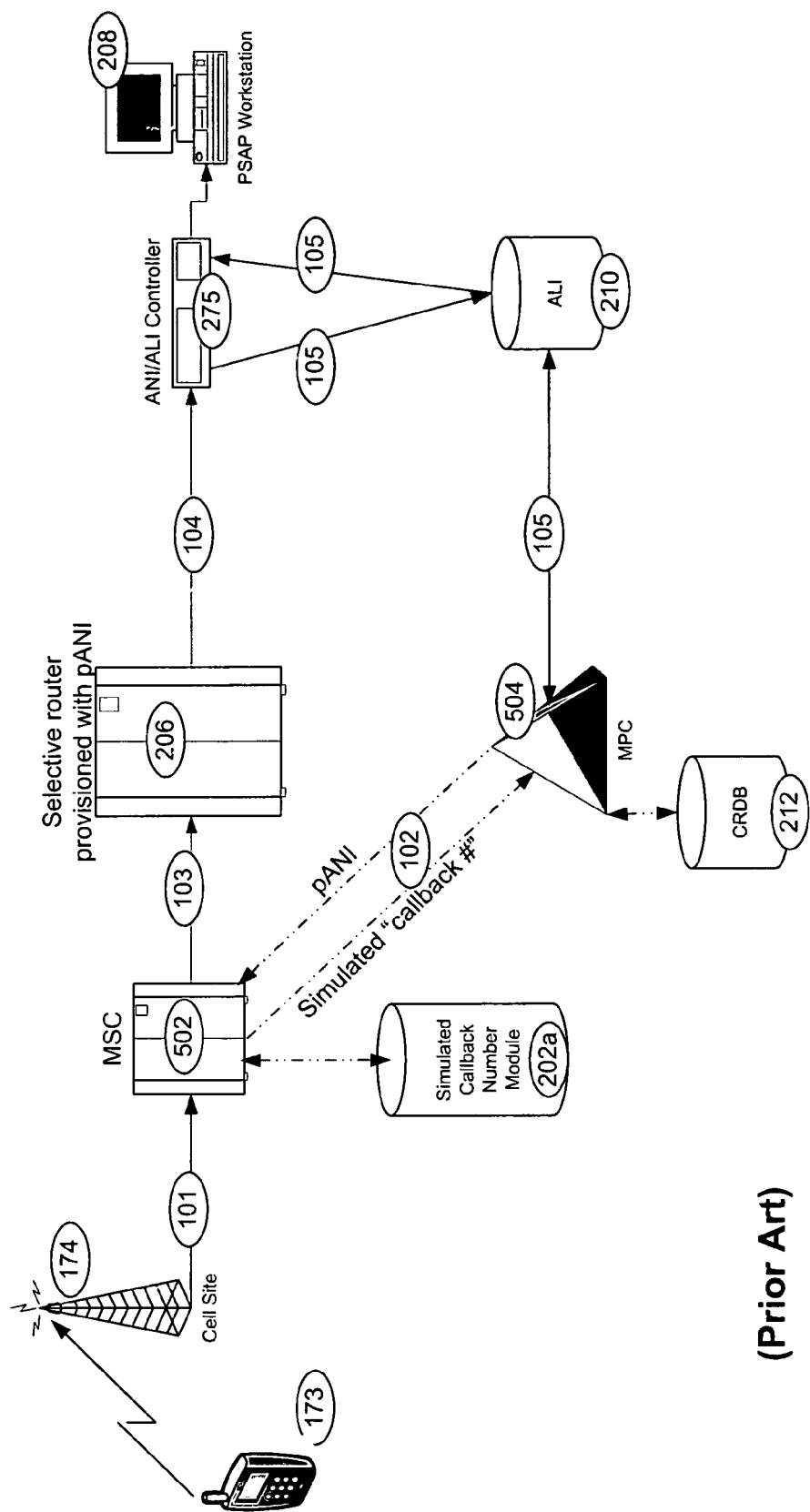
FIG. 3 shows conventional elements relating to routing of an E911 call from a cell phone.

FIG. 2 shows exemplary messaging to accomplish call blocking for E911 harassment calls, in the exemplary system shown in FIG. 1.

In particular, as shown in FIG. 2, an initial harassing call is placed from the uninitialized mobile phone 173 through a given cell site 174. The wireless harassment call is eventually designated as a harassing call, and handled appropriately.

As shown in step 101 of FIG. 2, the receiving cell site routes the 911 call to the MSC 202. The MSC 202 receives the call.

In response to receipt of the E911 wireless call, the simulated callback phone number module 202*a* is activated, and in response appends a 10-digit simulated callback phone number to the E911 call ("911" plus the last 7 digits of the ESN of the unitialized phone.)

The MSC 202 then queries the MPC 204 for call routing instructions for the E911 call, which at that point includes the 10-digit simulated callback phone number. Preferably, the query from the MSC 202 includes not only the simulated callback number (911+ last 7 digits of the ESN), but also the cellular tower from where the call originated.

Thus, the MSC 202 queries the MPC 204 for call routing instructions, and provides to the MPC 204 the simulated callback number across dedicated data circuits 102. Preferably, the query from the MSC 202 includes not only the simulated callback number (911+ last 7 digits of the ESN), but also the cellular tower from where the call originated. The MPC queries the Harrasser Number Data Base 216 to see if the simulated callback number is listed. In the absence of a match in the Harrasser Number Database 216, the MPC 204 queries a coordinate routing database (CRDB) 212, which determines that calls originiating from which cell towers should be routed to which PSAPs.

As shown in step 102, upon determining the appropriate PSAP to receive the call, the MPC 204 responds with appropriate call routing instructions. These instructions consist of a pseudo automatic number identifier (PANI) that relates to a specific trunk group 103 (e.g., CAMA or SS7 voice trunk) between the MSC 202 and the selective router 206. This pANI is, e.g., a 10-digit number compatible with the existing selective router 206 that serves that PSAP 208. The ESRK is preferably unique to that PSAP 208.

In step 103, the MSC 202 directs the 911 call to the designated selective router 206 via the identified trunk group 103. The E911 call is routed to the appropriate public safety answering point (PSAP) via the selective router 206, which has been provisioned to relate the specified pANI to a specific trunk group 104 that connects the selective router 206 to the intended PSAP 208.

In step 104, upon receipt of the emergency call with the specified pANI, the selective router 206 delivers the call using existing E911 infrastructure to the PSAP 208. The selective router 206, previously provisioned as is otherwise conventional to recognize the pANI in the ANI field of the CAMA or SS7 voice call, routes the call to the appropriate PSAP.

In step 105, per current existing technology, the PSAP 208 receives the voice call and using the PANI, queries the ALI database 210 for the location and call-back information. The ALI database 210 steers the pANI to the appropriate MPC 204, which responds to the ALI query with the simulated "callback" number of the originating phone.

Thus, the E911 call continues on to an ANI/ALI controller 275 or similar device within the PSAP 208, which communicates with an automatic location identifier (ALI) database 210, and ultimately on to a PSAP workstation manned by appropriate emergency personnel. The ALI database 210 is provisioned with the pANI so that queries using that PANI are routed to the MPC that initially issued the PANI. The ANI/ALI controller 275 queries the ALI 210 for ALI data related to the pANI. The ALI 210 routes the query to the MPC 204 via existing data circuits 105. The MPC 204 responds with the simulated callback number of the uninitialized phone.

TCP/IP data circuits 105 must be ordered and installed between the MPC 204 and the various ALI databases 210.

Web based Graphical User Interface 107 with appropriate access restrictions must be installed at the Harrassment Number Database 216. This interface is used for the PSAPs to identify harassing telephones according to their simulated callback number. Alternatively, this communications can be verbal, via fax, or other device between authorized personnel at the PSAP and personnel managing the Harrasser Number Database 216.

In step 106, the harasser harasses. For example, the harasser might merely breath heavily into the phone, whisper juvenile obscenities, whatever, and typically refuse to hang up.

In step 107, the PSAP dispatcher terminates the call, and in accordance with the principles of the present invention, notifies the MPC 204 of the simulated "callback" number associated with a harassing or prank 911 phone call.

In step 108, personnel at the MPC 204 list the reported simulated "callback" number in a suitable database of calls to be blocked from PSAPs in the future. The database may be a separate, special database, or may be integrated within a larger database. This database is represented by the harasser number database 216 shown in FIGS. 1 and 2.

In a preferred embodiment, personnel at the MPC 204 also assign a "timeout" period after which the simulated callback number that was listed in the harassing database is purged from the harassing database. At this point, the phone 173 would be free to call again, even as a harasser. However, given that a predefined period of time has elapsed since the last harassing call has been given from that phone 173, it is unlikely that the original harasser would harass again from the phone 173.

The timeout period may alternatively be automatically set without the need for operator intervention. Secure IP interfaces may be made available to PSAP personnel who invoke the timeout period directly.

As an alternative, rather than being purged, the callback number may be maintained in the blocked number database but de-activated or enabled in some way that maintains a record of the previous harassing 911 phone call made using that callback number. This allows normal operation of the wireless phone, but also a record of the undesirable harassing call made from that phone 173.

In step 109, the harasser might again dial 911. Again the MSC 202 activates the simulated callback phone number module 202*a* and appends a 10-digit simulated callback phone number to the 911 call. Again the MSC 202 routes the call to the MPC 204 per otherwise conventional processes.

However, this time, as shown in step 110, the MPC 204 compares the simulated callback phone number associated with the latest E911 call to entries in the harasser number database 216. In the given scenario, this time the MPC 204 recognizes the simulated "callback" number in the special harassing 911 dialer's database 216. As a result, the MPC 204, this time, responds with routing instructions to a 10-digit PSTN number of a pre-recorded announcement message element 279 instead of routing information to the otherwise designated PSAP 208.

The pre-recorded message played by the recording element 279 can, of course, be programmed to say anything. As an example, the pre-recorded message might state something like: "911 calls from this phone have been blocked because this phone has been identified by law enforcement authorities as a source of telephone harassment. To restore 911 service, please contact XYZ Wireless. Goodbye." In step 111, after a given "timeout" period of time later (e.g., several hours, one or more days, etc. later), the relevant entry of the simulated callback number corresponding to the harassing 911 dialer's phone 173 is automatically purged from the harasser number database 216, and normal 911 service is thus restored. Of course, a record of the phone having been listed in the harasser number database 216 along with pertinent information such as when the harassing call was made, the location of the phone when the harassing call was made, etc., may be recorded for later review by appropriate personnel.

Note that the inventive blocking technology will work to block calls from any wireless phone presumably desired not to be routed to a PSAP. The example of an uninitialized phone is used because uninitialized phones are the most commonly used type phones for harassment, and also are the most difficult to trace.

The present invention provides technology that results in the reduction of the waste of 911 emergency service resources caused by prank or harassing 911 calls made from uninitialized wireless devices. In extreme emergencies where time saves lives, the present invention might also be credited with the capability of saving lives that might otherwise be lost due to the delay or even failure of a legitimate 911 caller from a wireless device to reach 911 responders caused while the relevant PSAP 208 is tied up dealing with a prankster or harasser.

The principles of the present invention can also be implemented to route specific legitimate callers to specific 911 resources. For example, a person with a heart condition may purchase a special wireless phone solely for the purpose of dialing 911 in the event of a heart attack. At the prior request of the caller, their phone number may be maintained in a special database similar to the harassing 911 caller's database 216. Then, in accordance with the principles of the present invention, any/all 911 calls made from that particular phone with a phone number previously entered into the special database can be routed directly to a medical responder or other designated phone (e.g., their surgeon, etc.)

While the invention has been described with reference to the exemplary embodiments thereof, those skilled in the art will be able to make various modifications to the described embodiments of the invention without departing from the true spirit and scope of the invention.

What is claimed is:

1. A method of blocking an undesirable call from being routed to an intended phone, comprising:
   receiving, at a mobile positioning center (MPC), a query for routing instructions for an undesirable call associated with a simulated callback phone number from a remote mobile switching center (MSC);
   comparing, by said MPC, said simulated callback phone number with a known list of callback phone numbers to be blocked; and
   if a match is made by said comparing, blocking, by said MPC, routing of said undesirable call to said intended phone, by said MPC sending routing instructions including a routing number of a pre-recorded announcement element.

2. The method of blocking an undesirable call from being routed to an intended phone according to claim 1, wherein:
   said undesirable call is a 911 call.

3. The method of blocking an undesirable call from being routed to an intended phone according to claim 1, wherein:
   said designated recipient is a public safety answering point (PSAP).

4. The method of blocking an undesirable call from being routed to an intended phone according to claim 1, wherein:
   said simulated callback phone number is a 10-digit number.

5. The method of blocking an undesirable call from being routed to an intended phone according to claim 4, wherein said 10-digit simulated callback phone number comprises:
   "911" plus 7 digits corresponding to the electronic serial number (ESN) of said intended phone sending said undesirable call.

6. The method of blocking an undesirable call from being routed to an intended phone according to claim 5, wherein:
   said 7 digits are the last 7 digits of said ESN.

7. Apparatus for blocking an undesirable call from being routed to an intended phone, comprising:
   means for receiving, at a mobile positioning center (MPC), a query for routing instructions for an undesirable call associated with a simulated callback phone number from a mobile switching center (MSC);
   means for comparing, by said MPC, said simulated callback phone number with a known list of callback phone numbers to be blocked; and
   means for blocking, by said MPC, routing of said undesirable call to said intended phone if a match is made by said means for comparing, by said MPC sending routing instructions including a routing number of a pre-recorded announcement element.

8. The apparatus for blocking an undesirable call from being routed to an intended phone according to claim 7, wherein:
   said undesirable call is a 911 call.

9. The apparatus for blocking an undesirable call from being routed to an intended phone according to claim 7, wherein:
   said designated recipient is a public safety answering point (PSAP).

10. The apparatus for blocking an undesirable call from being routed to an intended phone according to claim 7, wherein:
    said simulated callback phone number is a 10-digit number.

11. The apparatus for blocking an undesirable call from being routed to an intended phone according to claim 10, wherein said 10-digit simulated callback phone number comprises:
    "911" plus 7 digits corresponding to the electronic serial number (ESN) of the phone sending said undesirable call.

12. The apparatus for blocking an undesirable call from being routed to an intended phone according to claim 11, wherein:
    said 7 digits are the last 7 digits of said ESN.

13. Apparatus for blocking an undesirable wireless call from being routed, comprising:
    a module to compare a callback number associated with a received, by a mobile positioning center (MPC), query for routing instructions for an undesirable call to entries in a blocked phone number list; and if a match is made between said callback number and an entry in said blocked phone number list, blocking routing, by said MPC, of said undesirable wireless call to an intended phone, by said MPC sending routing instructions including a routing number of a pre-recorded announcement element.

14. The apparatus for blocking an undesirable wireless call from being routed according to claim 13, further comprising:

if said match is made, providing routing to a predesignated recorded message device instructing a calling device of a reason for blocking routing of said undesirable wireless call to said intended phone.

15. The apparatus for blocking an undesirable wireless call from being routed according to claim 13, further comprising:

a timer to automatically purge entries from said blocked phone number list after a predetermined amount of time.

16. Apparatus for blocking an undesirable wireless call from being routed, comprising:

means for comparing, by a mobile positioning center (MPC), a callback number associated with a received query for routing instructions for an undesirable call to entries in a blocked phone number list; and means for blocking routing, by MPC, of said undesirable wireless call to an intended phone if a match is made between said callback number and an entry in said blocked phone number list, by said MPC sending routing instructions including a routing number of a pre-recorded announcement element.

17. The apparatus for blocking an undesirable wireless call from being routed according to claim 16, further comprising:

means for providing routing to a predesignated recorded message device instructing a calling device of a reason for blocking routing of said undesirable wireless call if said match is made.

18. The apparatus for blocking an undesirable wireless call from being routed according to claim 16, further comprising:

means for automatically purging entries from said blocked phone number list after a predetermined amount of time.

* * * * *